US011055895B2

(12) United States Patent
Oldcorn (10) Patent No.: US 11,055,895 B2
(45) Date of Patent: Jul. 6, 2021

(54) SHADER MERGE FOR REDUCED DIVERGENCE

(71) Applicant: Advanced Micro Devices, Inc., Santa Clara, CA (US)

(72) Inventor: David Ronald Oldcorn, Milton Keynes (GB)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 0 days.

(21) Appl. No.: 16/554,793

(22) Filed: Aug. 29, 2019

(65) Prior Publication Data

US 2021/0065423 A1 Mar. 4, 2021

(51) Int. Cl.
*G06T 15/00* (2011.01)
*G06T 15/80* (2011.01)
*G06T 1/20* (2006.01)

(52) U.S. Cl.
CPC ............. *G06T 15/005* (2013.01); *G06T 1/20* (2013.01); *G06T 15/80* (2013.01)

(58) Field of Classification Search
CPC .......... G06T 1/20; G06T 15/005; G06T 15/80
USPC ........................................ 345/501, 503, 426
See application file for complete search history.

(56) References Cited

U.S. PATENT DOCUMENTS

| 7,463,259 | B1* | 12/2008 | Kolb | .................... G06T 15/005 |
| | | | | 345/426 |
| 8,698,819 | B1* | 4/2014 | Mahan | ...................... G06T 1/20 |
| | | | | 345/506 |
| 2013/0185705 | A1* | 7/2013 | Kuesel | ............... G06F 9/44542 |
| | | | | 717/152 |
| 2016/0055667 | A1* | 2/2016 | Goel | ....................... G06T 15/83 |
| | | | | 345/522 |
| 2016/0078671 | A1* | 3/2016 | Olsen | ........................ G06T 3/00 |
| | | | | 345/426 |
| 2016/0225118 | A1* | 8/2016 | Nevraev | .................... G06T 1/20 |
| 2016/0307364 | A1* | 10/2016 | Fabius | .................. G06T 15/005 |
| 2018/0082470 | A1* | 3/2018 | Nijasure | ................. G06T 15/80 |

* cited by examiner

*Primary Examiner* — Jacinta M Crawford
(74) *Attorney, Agent, or Firm* — Volpe Koenig (57) ABSTRACT

Described herein are techniques for reducing control flow divergence. The method includes identifying two or more shader programs having commonalities, generating a merged shader program that implements functionality of the identified two or more shader programs, wherein the functionality implemented includes a first execution option for a first shader program of the two or more shader programs and a second execution option for a second shader program of the two or more shader programs, modifying shader programs that call the first shader program to instead call the merged shader program and select the first execution option, modifying shader programs that call the second shader program to instead call the merged shader program and select the second execution option.

20 Claims, 7 Drawing Sheets

SHADER MERGE FOR REDUCED DIVERGENCE

BACKGROUND

Single-instruction multiple-data ("SIMD") processors achieve parallelization of execution by using a single control flow module with multiple items of data. It is possible for control flow to diverge when the control flow is dependent on the data, since different threads of execution can have different values for the data on which control flow depends. In such situations, the different control flow paths are serialized, resulting in a slowdown.

BRIEF DESCRIPTION OF THE DRAWINGS

A more detailed understanding may be had from the following description, given by way of example in conjunction with the accompanying drawings wherein.

DETAILED DESCRIPTION

Described herein are techniques for reducing control flow divergence. The method includes identifying one or more shader programs having commonalities; generating a merged shader program including the commonalities; including selection logic in the merged shader program, wherein the selection logic is configured to select, based on a selection variable, one or more of: at least one differing section; and at least one constant value; and modifying calls, in one or more calling shader programs, to the one or more shader programs into calls to the merged shader program, and adding assignments to the one or more calling shader programs, wherein the assignments assign a selection value to the selection variable, wherein the selection value is configured to cause the merged shader program to select the one or more of the at least one differing section and the at least one constant value when the merged shader program is executed.

Figure 1:
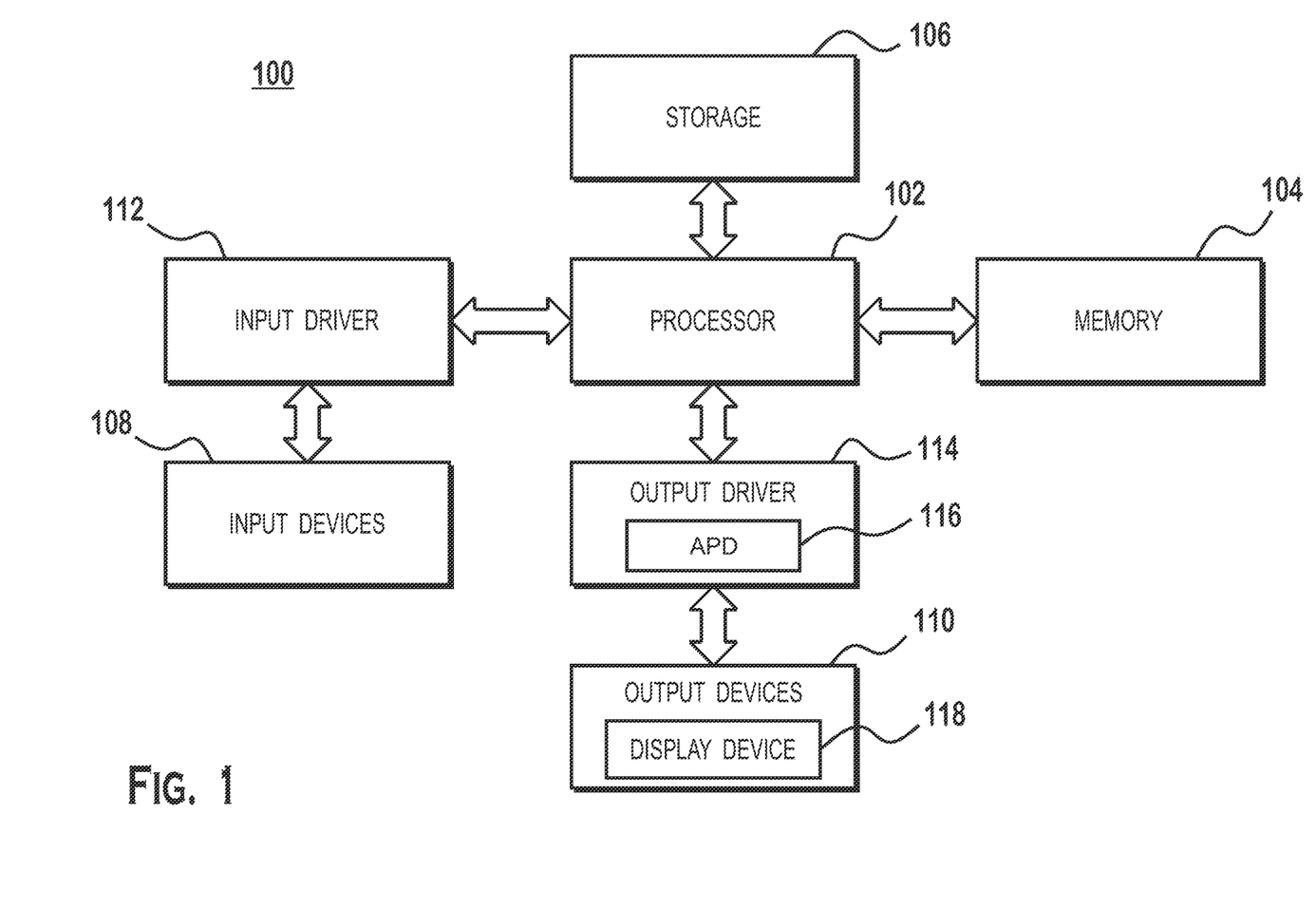
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. It is contemplated that functionality described as being performed on hardware described as "SIMD" is instead performed on hardware that does not necessarily have SIMD capabilities or is not primarily SIMD hardware.

Figure 2:
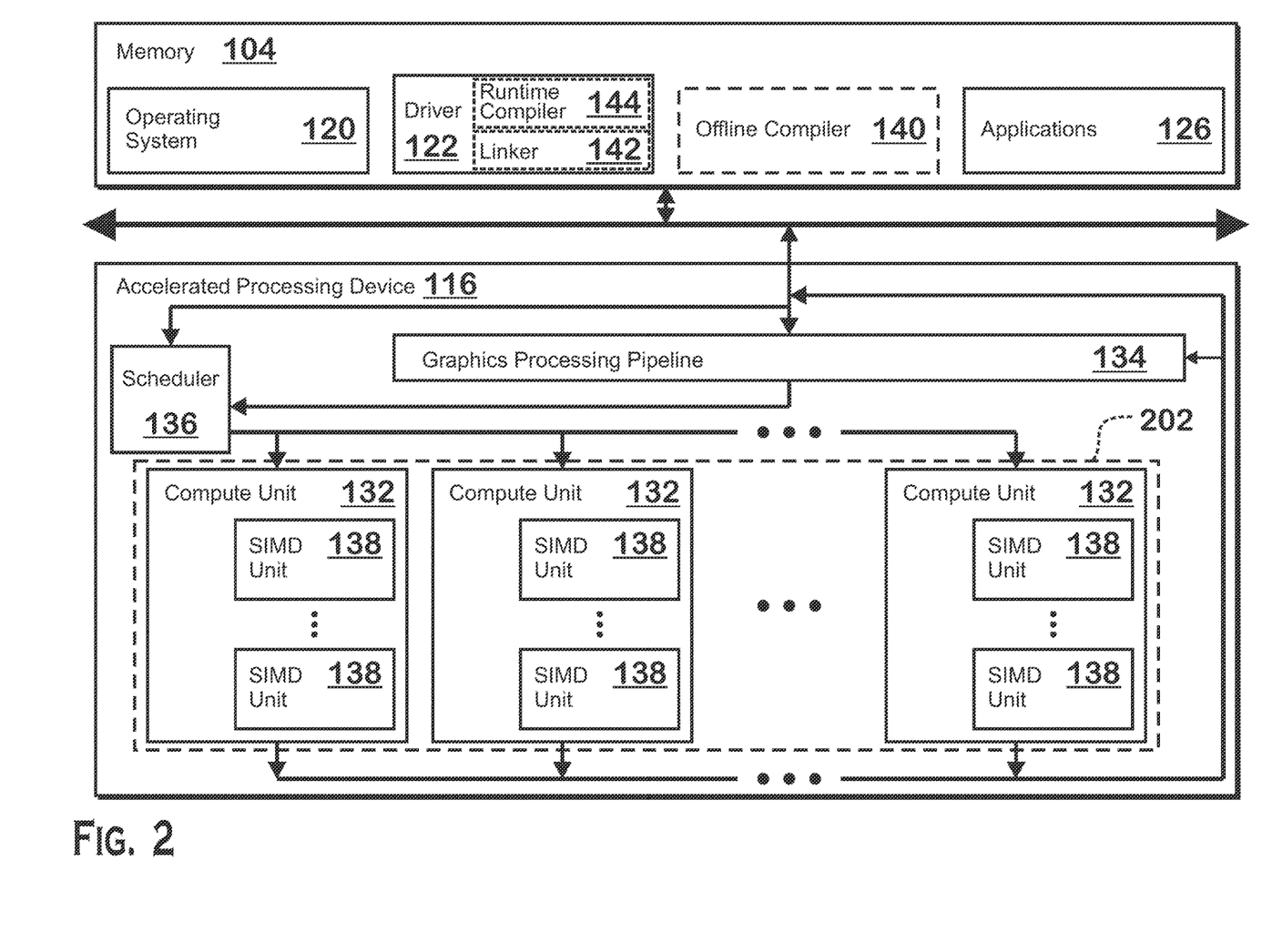
FIG. 2 is a block diagram of the device, illustrating additional details related to execution of processing tasks on the accelerated processing device, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not related, or not directly related to graphics operations, such as operations related to video, physics simulations, computational fluid dynamics, or other tasks, based on commands received from the processor 102. The APD 116 also executes compute processing operations that are related to ray tracing-based graphics rendering.

The APD 116 includes compute units 132 (which is sometimes be referred to herein collectively as "parallel processing units 202") that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed together as a "wavefront" on a single SIMD processing unit 138. The SIMD nature of the SIMD processing unit 138 means that multiple work-items execute in parallel simultaneously. Work-items that are executed together in this manner on a single SIMD unit are part of the same wavefront. In some implementations or modes of operation, a SIMD unit 138 executes a wavefront by executing each of the work-items of the wavefront simultaneously. In other implementations or modes of operation, a SIMD unit 138 executes different sub-sets of the work-items in a wavefront in parallel. In an example, a wavefront includes 64 work-items and the SIMD unit 138 has 16 lanes (where each lane is a unit of the hardware sized to execute a single work-item). In this example, the SIMD unit 138 executes the wavefront by executing 16 work-items simultaneously, 4 times.

One or more wavefronts are included in a "workgroup," which includes a collection of work-items designated to execute the same program. An application or other entity (a "host") requests that shader programs be executed by the accelerated processing device 116, specifying a "size" (number of work-items), and the command processor 136 generates one or more workgroups to execute that work. The number of workgroups, number of wavefronts in each workgroup, and number of work-items in each wavefront correlates to the size of work requested by the host. In some implementations, the host specifies the number of work-items in each workgroup for a particular request to perform work, and this specification dictates the number of workgroups generated by the command processor 136 to perform the work. As stated above, the command processor 136 dispatches workgroups to one or more compute units 132, which execute the appropriate number of wavefronts to complete the workgroups.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

In some implementations, the accelerated processing device 116 implements ray tracing, which is a technique that renders a 3D scene by testing for intersection between simulated light rays and objects in a scene. Much of the work involved in ray tracing is performed by programmable shader programs, executed on the SIMD units 138 in the compute units 132. Although some of the teachings presented herein are described in the context of ray tracing work being performed on the APD 116, it should be understood that various teachings presented herein may be applied in workloads other than ray tracing workloads.

Shader programs to be executed on the APD 116 are compiled from source code into machine instructions. In some implementations, such compilation occurs in one or more stages. In some examples, an offline compiler 140 (where "offline" is differentiated from a runtime compiler 144) compiles the shader programs to an intermediate format and, as the application 126 is being loaded for execution, a runtime compiler 144 compiles the shader programs to a final format with machine instructions. Some examples of the intermediate format include LLVM IR (low level virtual machine intermediate representation) or HSAIL (heterogeneous system architecture intermediate language). In some implementations, a runtime linker 142 links multiple compiled shader programs into larger composite or "stitched" shader programs. In some situations, the offline compiler 140 is present on the computer system of an application developer, but not on a computer system of an end user that runs the application. In some situations, the runtime compiler 144 and linker 142 are not present on the same computer system as an offline compiler 140. Thus although the two compilers and the linker (offline compiler 140, runtime compiler 144, and linker 142) are illustrated together in a memory 104, it should be understood that systems including only one or two of these components also fall within the scope of this disclosure. In some implementations, the offline compiler 140, runtime compiler 144, and linker 142 are embodied as software programs that execute on a processor such as processor 102.

Some workloads involving shader programs are complex, involving the execution of different shader programs based on the results of conditional evaluations whose results can vary with each instance of execution. In the example of ray tracing, one ray hits a first triangle having a first material and thus requiring a first material shader, and another ray hits a second triangle having a second material and thus requiring a second material shader. Moreover, in some instances, it is only possible to determine at runtime, the specific shader programs that can possibly be executed for a particular application. In such situations (or in various other situations), multiple shader programs are compiled and then stitched together into a larger shader program by the linker 142. In such a stitched shader program, the individual shader programs that comprise the stitched shader program are sometimes referred to herein as shader programs or shaders, or alternatively are referred to as "sub-shader programs." With a stitched shader program, at various stages of execution, the stitched shader program selects one of several sub-shader programs to execute. In other words, such a stitched shader program includes multiple shader programs in a group of alternative shader programs, and each work-item selects one the alternative shader programs. This selection is accomplished by including each of the sub-shader programs in the stitched shader program and including instructions for selection of a shader program based on execution-time criteria. In an example, a switch statement evaluates a variable and causes a particular sub-shader program to execute based on the value stored in the variable. Any other technically feasible mechanism to select a particular sub-shader program may alternatively or additionally be used.

Figure 3:
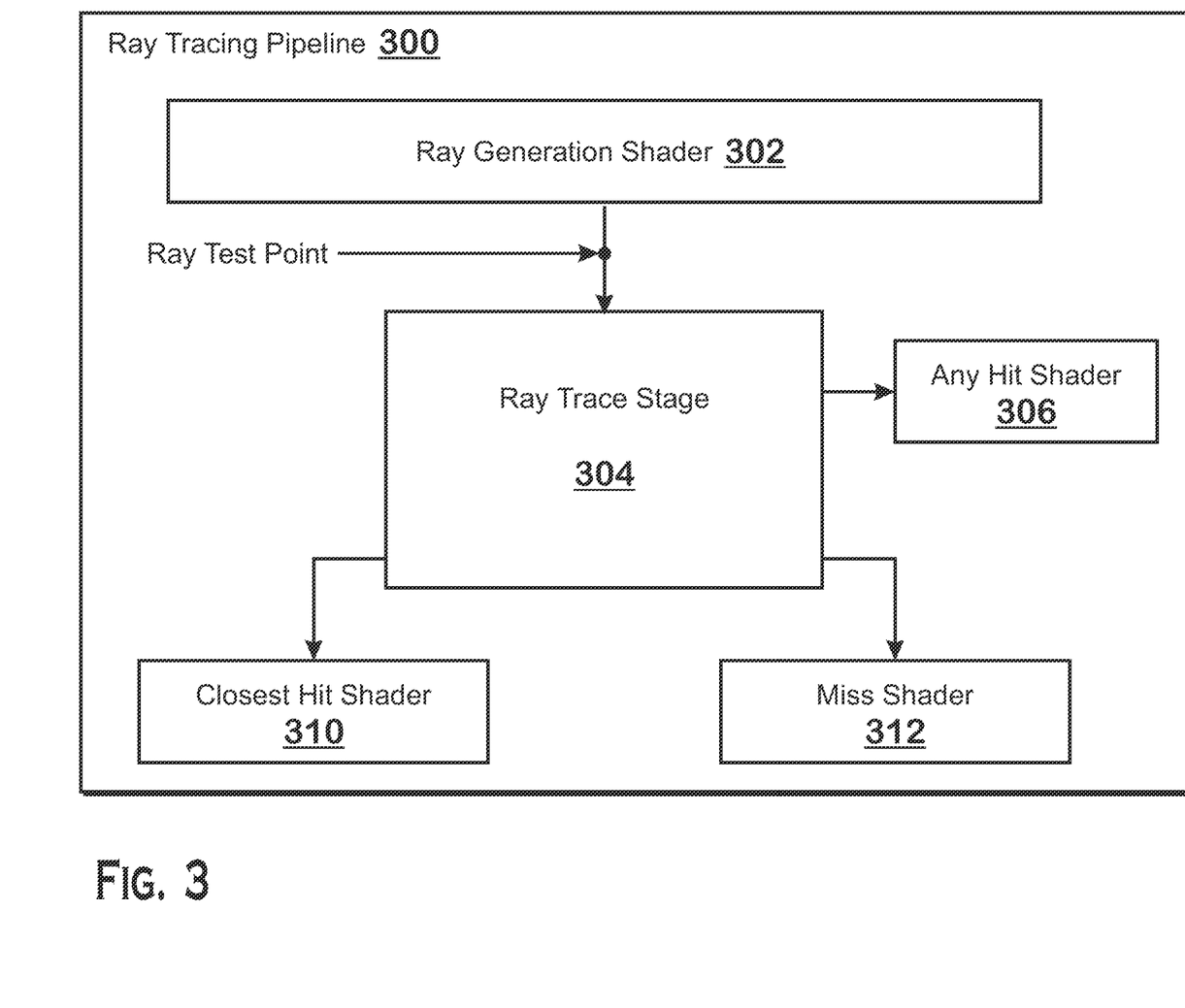
FIG. 3 illustrates a ray tracing pipeline for rendering graphics using a ray tracing technique, according to an example.

One example workload for which a stitched shader program is be useful is ray tracing. FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD units 138. Any of the specific shader programs at each particular shader-implemented stage are defined by application-provided code (i.e., by code provided by an application developer that is pre-compiled by an application compiler and/or compiled by the driver 122). The ray trace stage 304 performs a ray intersection test to determine whether a ray hits a triangle. In various implementations, the ray trace stage 304 is performed by a shader program executing in the SIMD units 138 or by fixed function hardware configured to perform ray intersection tests.

The various programmable shader stages (ray generation shader 302, any hit shader 306, closest hit shader 310, miss shader 312) are implemented as shader programs that execute on the SIMD units 138. It is possible for there to be multiple shader programs that can execute at any given shader stage. For example, for the closest hit shader 310, which is commonly used as a material shader, the specific shader program that is executed varies based on the material of the triangle that is hit by the ray. The command processor 136 orchestrates execution of the ray tracing pipeline 300. Specifically, the command processor 136 is a programmable unit that executes instructions to cause the various stages of the ray tracing pipeline 300 to be performed on the APD 116. Additional details are provided elsewhere herein.

The ray tracing pipeline 300 operates in the following manner. One or more compute units 132 execute a ray generation shader 302. The ray generation shader 302 requests the ray trace stage 304 to perform one or more ray intersection tests. Each ray intersection test defines an origin and direction for a ray trace operation, which determines whether the ray hits one or more triangles or whether the ray does not hit any triangle.

The ray trace stage 304 identifies one or more triangles intersected by a ray for a ray intersection test, or, if no triangles are intersected by the ray up to a given distance, determines that the ray does not hit any triangles (i.e., that the ray "misses"). The ray trace stage 304 is implemented in any technically feasible manner. In one example, the ray trace stage 304 is implemented as a shader program executing on one or more compute units 132. In another example, the ray trace stage 304 is implemented as fixed function hardware.

Ray trace stage 304 triggers execution of a closest hit shader 310 for the triangle closest to the origin of the ray that the ray hits, or, if no triangles were hit, triggers a miss shader. A typical use for the closest hit shader 310 is to color a material based on a texture for the material. A typical use for the miss shader 312 is to color a pixel with a color set by a skybox. It should be understood that in various implementations, the shader programs defined for the closest hit shader 310 and miss shader 312 implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point corresponding to a camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. In some implementations, multiple rays are cast per pixel, with the final color of the pixel being determined by some combination (e.g., an average) of the colors determined for each of the rays of the pixel. It is possible for any particular ray generation shader 302 (or any other shader) to also specify that an any hit shader 306 is to be executed for any of the hits between a ray and a triangle, even if such hits are not the closest hit.

It is possible for the closest hit shader 310 and/or miss shader 312 to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color at the hit location to the pixel corresponding to the closest hit shader 310 that spawned the rays. It should be understood that although some examples of ways in which the various components of the ray tracing pipeline 300 can be used to render a scene have been described, in various alternative implementations, any of a wide variety of techniques are alternatively used.

It should be understood that in various examples, any shader program written for the closest hit shader stage 310, miss shader stage 312, or any hit shader stage 306, implements any of the operations described elsewhere herein as being performed by shader programs written for the ray generation stage 302. For example, in addition to spawning new rays to be provided to the ray test point for testing at the ray trace stage 304, in some instances, such shader programs specify whether misses or hits should spawn additional rays to trace (starting again at the ray test point), what shader programs to execute for any such additional rays, how to combine the color and/or luminosity values generated by such additional shader program executions, and any other operations that could be performed by a ray generation shader 302.

Shader programs are launched as "shader program dispatches" on the APD 116. A shader program dispatch specifies a particular shader program (e.g., a stitched shader program), as well as a number of work-items that will be executed as part of the shader program dispatch. The scheduler 136 breaks the shader program dispatch up into workgroups and assigns workgroups to one or more compute units 132 for execution. The workgroups of a shader program dispatch begin execution, execute their instructions, and then terminate execution. A workgroup executes as one or more wavefronts within a compute unit 132. A wavefront executes on a SIMD unit 138, as a plurality of work-items executing concurrently.

Each wavefront includes work-items that execute simultaneously in a single-instruction-multiple-data ("SIMD") manner. More specifically, the SIMD units 138 execute shader programs in a manner in which a single instruction pointer is used to control program execution for multiple work-items, and therefore multiple instructions can execute simultaneously. In an example, four work-items of a wavefront execute on a SIMD unit. Part of the execution control flow begins at a section shown in pseudo code below:

TABLE 1

Example SIMD pseudo-code

```
#begin section
add r1, r2, r3
mul r4, r1, r5
store [r6], r4
```

The first instruction adds the value in r2 to the value in r3 and stores the result in r1. The second instruction adds the value in r1 to r5 and stores the result in r4. The third instruction stores the value in r4 to the address specified in r6. Lanes of the wavefront executing this pseudo-code execute simultaneously, so that multiple adds, multiplies, and stores are executed simultaneously, once for each lane. "r1" through "r6" represent register names.

It is possible for control flow to diverge among lanes in a SIMD unit 138 and thus among work-items of a wavefront. More specifically, some instructions modify the instruction pointer based on the value of a particular variable. In an example, a conditional branch is an instruction whose jump target is based on the results of evaluation of a conditional. In another example, a jump targets an address specified in a variable. When control flow is divergent in this manner, the SIMD unit 138 serializes each of the possible paths that at least one lane is to execute. More specifically, the SIMD unit 138 executes each of these possible paths, with lanes designated to execute a particular path switched on during execution of that path and with lanes designated not to execute a particular path switched off during execution of that path. The following example pseudo-code illustrates a situation that can result in divergent control flow.

TABLE 2

Example SIMD divergence

```
add r1, r2, 5
blz r1, LESS_THAN_ZERO
# GREATER_THAN_ZERO:
...section 1
jmp RECONVERGE
LESS_THAN_ZERO:
...section 2
RECONVERGE:
...
```

In table 2, each lane executes the instruction add r1, r2, 5, which adds the value of 5 to r2 and stores the result in r1. The blz instruction is a conditional branch that branches if the value in r1 is less than zero. If the value in r1 is greater than zero, the control flow falls through to section 1, which includes some instructions and then a jump instruction to the "reconverge" label. Referring back to the conditional branch, if the value in r1 is not greater than zero, the control flow proceeds to the label LESS_THAN_ZERO, and section 2 is executed. At label "RECONVERGE," the control flow reconverges.

If a first lane executing in a wavefront had the value -10 stored in r2 when the first instruction shown were executed, then register r1 for that lane would store the value -5 after that first instruction, which would cause the first lane to execute section 2 at "LESS_THAN_ZERO." If a second lane executing in the same wavefront had the value 1 in r2 when the first instruction were executed, then the register r1 for that lane would store the value 6, which would cause that lane to not branch and execution section 1. The execution of section 1 and section 2 by different lanes would be accomplished by executing each section sequentially, with the lanes not executing a particular section switched off. More specifically, the divergence would cause SIMD unit 138 to execute section 1 for the second lane, with the first lane switched off, and then to execute section 2 for the first lane, with the second lane switched off, which reduces the efficiency of processing because multiple lanes that might otherwise execute simultaneously are now serialized.

Another example of divergent control flow is presented with respect to Table 3.

TABLE 3

Example SIMD divergence - function pointers

```
Trace ray to detect triangle intersection
Identify material of intersected triangle
Store address of material shader for identified material in r1
jmp [r1]
MATERIAL_SHADER_1:
...
jmp END_MATERIAL_SHADERS
MATERIAL_SHADER_2:
...
jmp END_MATERIAL_SHADERS
MATERIAL_SHADER_3:
...
jmp END_MATERIAL_SHADERS
...
END_MATERIAL_SHADERS:
...
```

In the example of Table 3, each lane performs a trace ray to detect a triangle intersection. Then each lane identifies the material of the intersected triangle and stores the address of the material shader for the identified material in register r1. Then each lane jumps to the address stored in r1. In some examples, these addresses are the various material shaders ("MATERIAL_SHADER_1," "MATERIAL_SHADER_2," etc.) illustrated. After executing a material shader, the lane jumps to "end_material_shaders." If each lane hit a triangle with a different material shader, then each of those material shaders would be serialized, resulting in a slowdown equal to the number of lanes in a wavefront—which would represent total deparallelization. Note, a material shader is a section of code used for ray tracing that is executed to provide a color for a ray that intersects a triangle (e.g., at the closest hit shader stage) or that misses a triangle and is thus colored by the skybox (e.g., at the miss stage).

In some examples, on a SIMD processor, the point at which a branch instruction exists is a "branch point." Branches at branch points point to one or more branch targets. Branches that have a fixed target have a single branch target and branches that have a variable target sometimes have more than one branch target. There are also reconvergence points, which are points where lanes that have diverged due to taking different branch paths necessarily reconverge. The sequence of instructions that begins at a branch target is referred to herein as a "taken path." The sequence of instructions that begins at the instruction immediately following a conditional branch (the "not-taken point") is referred to herein as a "not-taken path." Collectively, taken paths and not-taken paths are referred to herein as "code paths." Each code path extends from a branch target or a not-taken point to a reconvergence point or a branch point. Essentially, each code path defines a sequence of instructions within which the combination of lanes that execute that code path cannot change (which change would occur due to a branch or a reconvergence).

To execute a sequence of instructions that includes a branch, the SIMD processor evaluates the branch instruction for each lane and, based on the results, sets the bit values within an execution bitmask for each code path that could be reached from the branch. Each bit in the bitmask is associated with one lane of the wavefront being executed. One bit value in the bitmask (such as "1") indicates that a corresponding lane will execute that code path. The other bit value in the bitmask (such as "0") indicates that a corresponding lane will not execute that code path.

After determining bitmasks for the different code paths, the SIMD processor advances or modifies the instruction pointer as necessary until all code paths that at least one lane is to execute have in fact been executed. For code paths whose bitmask indicates that no lanes execute that code path, the SIMD processor modifies the instruction pointer to skip that code path. In general, modifying the instruction pointer as necessary involves modifying the instruction pointer from the address of the last instruction of one code path that is executed by at least one lane to the address of another code path that is executed by at least one lane. In some implementations, such modifying includes simply incrementing the instruction pointer if two code paths to be executed are laid out sequentially in memory, or involves a "true branch," meaning that the instruction pointer is modified in a way other than simply incrementing the instruction pointer, by setting the instruction pointer to the address of the first instruction of a code path to be executed.

Figure 4:
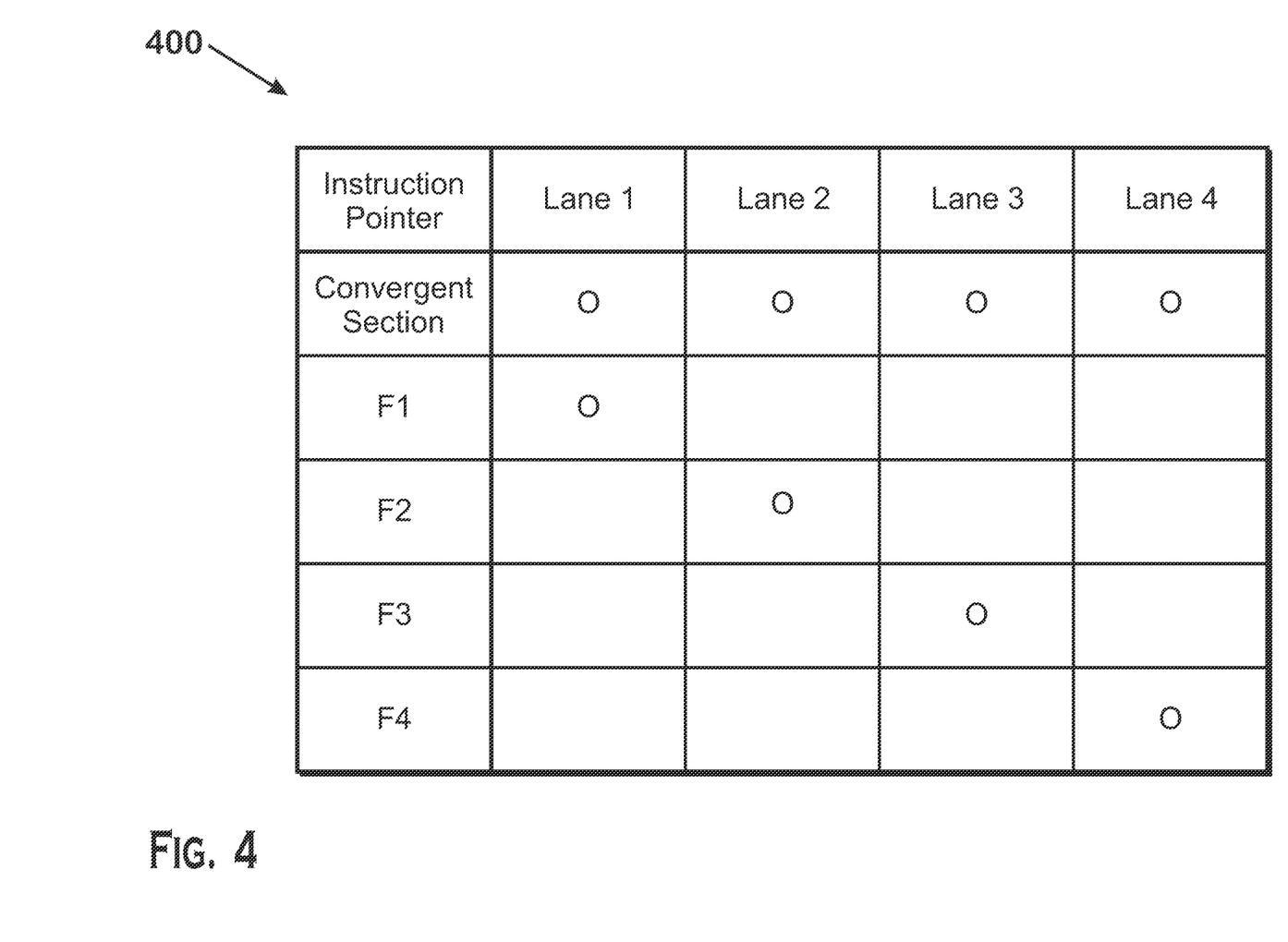
FIG. 4 illustrates serialization resulting from divergent control flow, according to an example.

FIG. 4 illustrates serialization resulting from divergent control flow, according to an example. A table 400 illustrates several sections of code, listed as "convergent section," "F1," "F2," "F3," and "F4." Time proceeds downwards in the figure. A mark "O" in a given box indicates that the lane executes the section of code in a given section of time. In the convergent section, it is assumed that each of lanes 1 through 4 execute that section together. Thus there is a mark "O" for each lane in the convergent section. Due to the results of the convergent section, it is determined that lane 1 will execute F1 and not F2, F3, or F4, that lane 2 will execute F2 and not F1, F3, or F4, that lane 3 will execute F3 and not F1, F2, or F4, and that lane 4 will execute F4 and not F1, F2, or F3. As can be seen, each of F1, F2, F3, and F4 executes in a different section of time, and thus execution of the wavefront including lanes 1 through 4 is deparallelized. More specifically, in a first section of time, lane 1 executes function F1 with lanes 2-4 switched off. In a second section of time, lane 2 executes function F2 with lanes 1 and 3-4 switched off. In a third section of time, lane 3 executes function F3, with lanes 1-2 and 4 switched off. In a fourth section of time, lane 4 executes function F4, with lanes 1-3 switched off.

Figure 5:
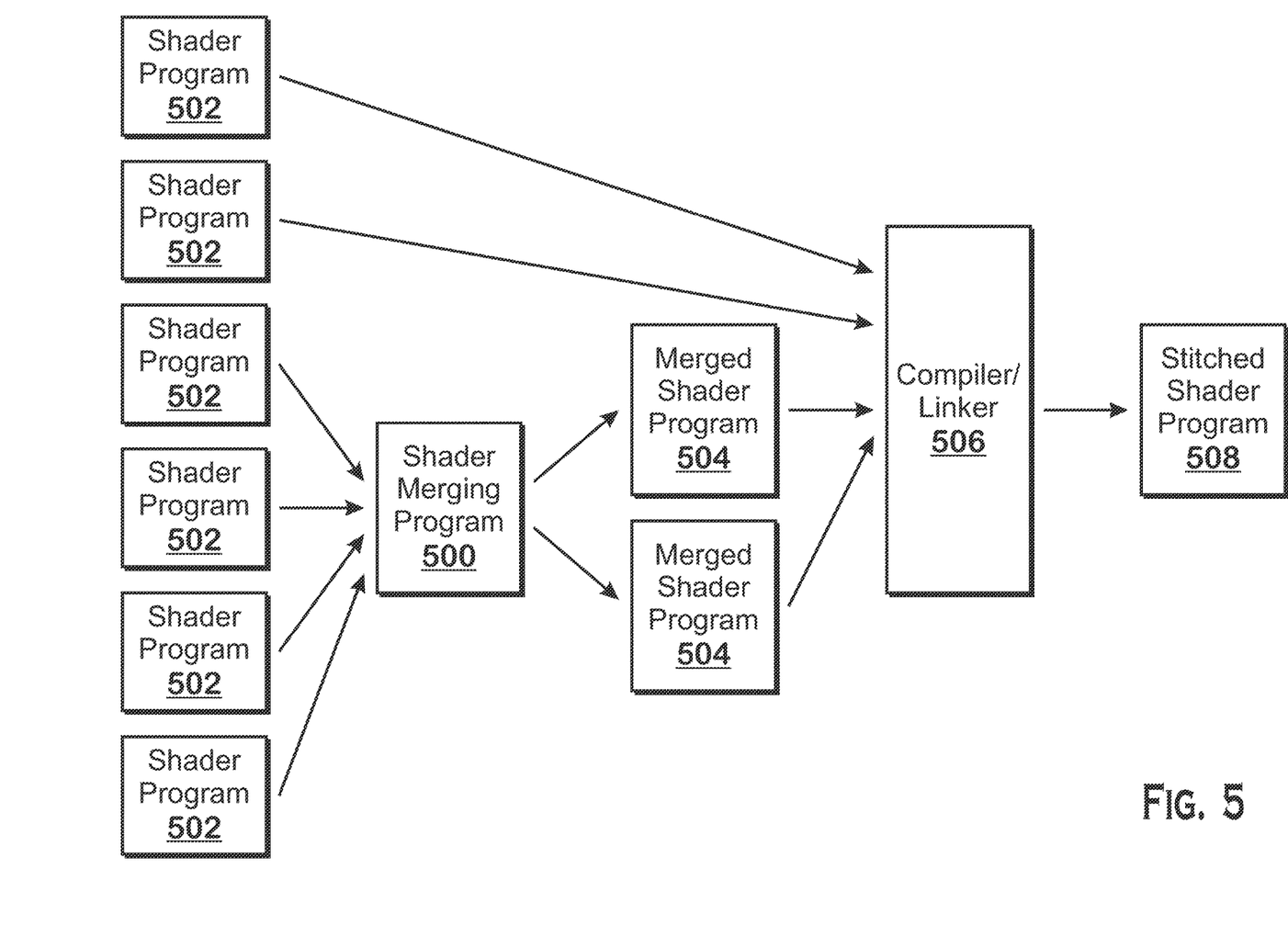
FIG. 5 illustrates operations of a shader merging program, according to an example.

FIG. 5 illustrates operations of a shader merging program 500, according to an example. To reduce control flow divergence, a shader merging program 500 merges shader programs 502. The shader merging program 500 is, or is a part of, one or more of a compiler or a linker, which are programs stored in memory and executed by a processor. In various examples, the compiler is the runtime compiler 144, the offline compiler 140, or any other compiler. In various examples, the linker is the linker 142 or any other linker.

The phrase "merges shader programs" means that the shader merging program 500 identifies two or more shader programs 502 that are sufficiently similar and converts those two or more shader programs 502 into a smaller number of merged shader programs 504. The shader merging program 500 performs this any number of times for the shader programs 502 that are to eventually be stitched together into a stitched shader program 508. In other words, the shader merging program 500 combines any number of shader programs 502 to form any smaller number of merged shader program 504. In addition, the shader merging program 500 merges multiple merged shader programs 504 into a new merged shader program 504, and/or merges one or more merged shader programs 504 with one or more shader programs 502 to form new merged shader programs 504. In various implementations, the teachings disclosed herein describing merging multiple shader programs 502 to form a merged shader program 504 also apply to any of the above alternatives. The merged shader programs 504 are then further compiled and linked by compiler/linker 506 to form a stitched shader program 508. In various examples, the compiler/linker 506 is one or more of the runtime compiler 144, the linker 142, or the offline compiler 140, or any other program having the capabilities described herein.

The shader merging program 500 merges shader programs 502 by identifying commonalities between different shader programs 502 and generating merged shader programs 504 including the commonalities. Herein, the term "identical section" has the same meaning as the term "commonalities." The merged shader programs 504 include sections corresponding to the commonalities (identical sections), and sections corresponding to portions of the shader programs 502 that are merged together other than the commonalities ("differing sections"). The shader merging program 500 also includes, in the merged shader program 504, selection code, to select differing sections. The differing sections selected cause the merged shader program 504 to perform the functionality of one of the original shader programs 502 from which the merged shader program 504 was formed.

It is possible for identical sections in different shader programs 502 to be identical other than having different constant values. Such identical sections would still be treated as described above (that is, the identical section would be executed by the merged shader program 504 regardless of the value of the selection variable), except that the selection variable and selection code causes the constant associated with a particular original shader program 502 to be selected as appropriate when executed. It is possible to use either or both of the differing constant technique and the differing section technique together in generating the merged shader programs 504. In an example, two shader programs 502 are identical except for one or more constant values and the shader merging program 500 generates a merged shader program 504 including this identical code, as well as selection code to select a set of constant values to correspond to one of the shader program 502. It is also possible to use either of such technique alone. It is also possible to use any number of instances of the differing constant technique and the differing section technique to generate a single merged shader program 504.

By transforming the shader programs 502 in this manner, to form merged shader programs 504, sections of shader programs 502 that would be divergent due to being in different shader programs 502 are instead unified into single sections of the merged shader programs 504. Because fewer divergent sections are included in the stitched shader program 508, the total amount of divergent execution is reduced and the execution efficiency is increased.

Figure 6:
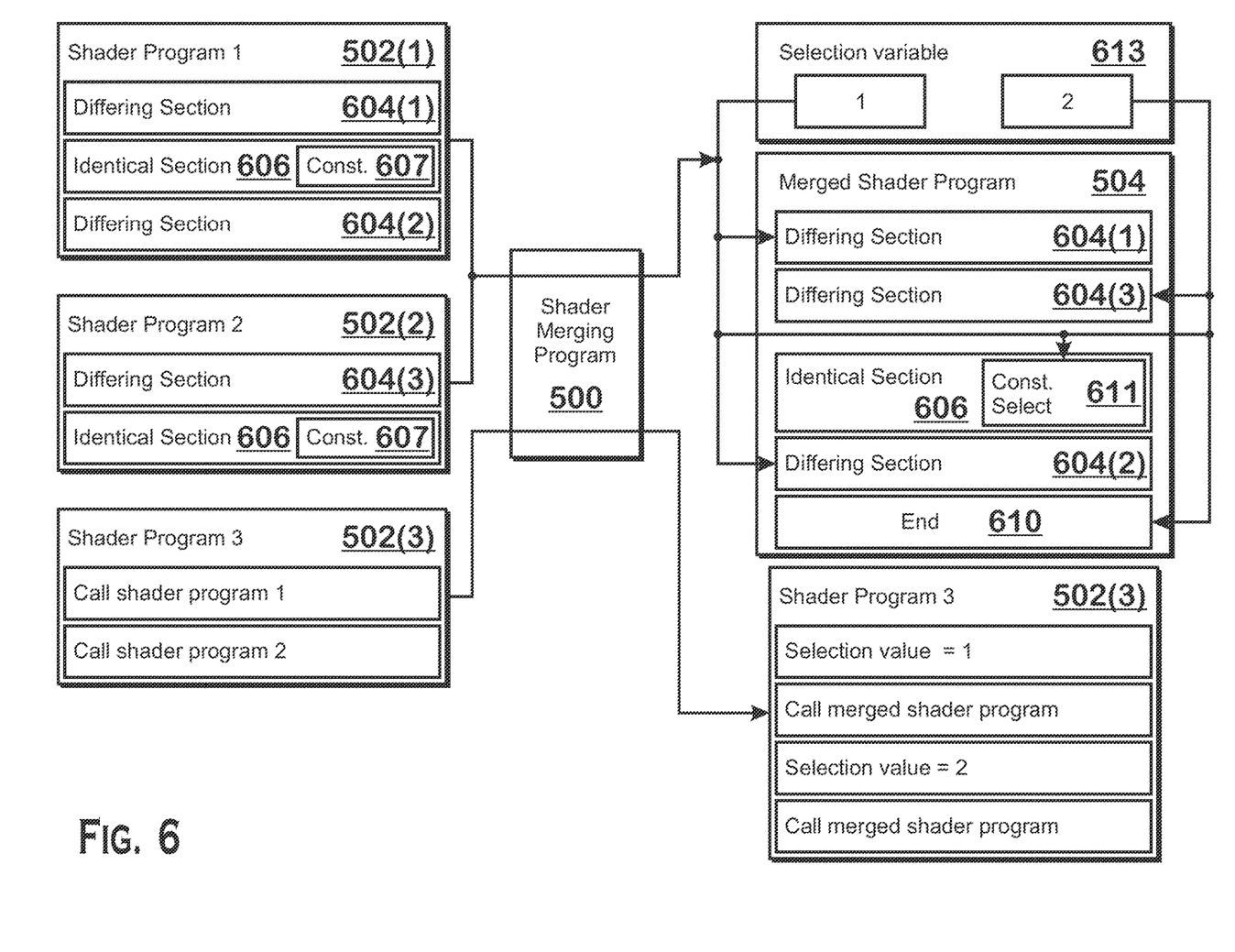
FIG. 6 illustrates an example shader program merge, in which three differing sections and one differing constant are identified.

As used herein, the term "execution option" refers to executing a merged shader program 504 in accordance with the functionality of a particular source shader program 502 (i.e., shader program from which the merged shader program 504 is generated). In some examples, the term "execution option" means executing a particular differing section 604 corresponding to a particular source shader program 502. In some examples, the term "execution option" means executing a section with a particular constant value corresponding to a particular source shader program 502.

In addition to merging shader programs into merged shader programs 504, the shader merging program 500 modifies shader programs 502 that invoke the shader programs 502 to be combined to instead invoke the merged shader programs 504. More specifically, for each merged shader program 504, the shader merging program 500 examines each of the shader programs 502 to be included in the stitched shader program 508 to find invocations of shader programs 502 that are merged to form the merged shader program 504. The shader merging program 500 converts these shader program invocations into shader program invocations to the merged shader program 504. As part of the invocation to the merged shader program 504, the shader merging program 500 includes code to set a selection variable to a value based on the original shader program 502 to be executed. The selection variable selects the differing sections corresponding to one of the original shader programs 502 when the merged shader program 504 is run. In an example, a first, second, and third shader program 502 are to be merged into a merged shader program 504. The shader merging program 500 converts invocations in any of the shader programs 502 to any of these first, second, and third shader programs 502 into invocations to the merged shader program 504. The shader merging program 500 also includes, as part of these invocations, code to set a selection variable to a value indicative of one of the first, second, or third shader programs 502. When the merged shader program 504 is executed, the selection variable selects the functionality of the first, second, or third shader program.

FIG. 6 illustrates an example shader program merge, in which three differing sections and one differing constant are identified. The shader merging program 500 determines that shader program 1 502(1) and shader program 2 502(2) include identical sections 606. The identical section 606 is identical except that the identical sections 606 recite different constant values 607. Shader program 1 502(1) and shader program 2 502(2) also include a differing section prior to the identical section 606, represented by differing section 604(1) in shader program 1 502(1) and differing section 604(3) in shader program 2. In various examples, these differing sections differ in a wide variety of ways, such as by having inclusions, deletions, or modifications with respect to each other. Shader program 1 502(1) also includes differing section 604(2) after the identical section 606, while shader program 2 502(2) has no code after the identical section 606. Shader program 3 502(3), prior to modification by the shader merging program 500, includes a call to shader program 1 502(1) and a call to shader program 2 502(2).

The shader merging program 500 generates a merged shader program 504 that includes the identical section 606. Because the identical section 606 in shader programs 1 and 2 have varying constants 607, the identical section 606 in the merged shader program 504 includes a constant selection phrase 611 that selects one of the constants 607 from the shader programs 502 based on the selection value 613. The merged shader programs 504 also include each of the differing sections 604 from shader programs 1 and 2. The merged shader program 504 also includes flow selection code (not shown) that selects appropriate differing sections 604 based on the value of the selection variable 613. The effect of the flow selection code is illustrated with the arrows from the possible values of the selection variable 613 (1 and 2) to the different portions of the merged shader program 504. The flow selection code causes the differing sections 604 associated with a particular selection value to execute, and the differing sections 604 not associated with that selection value to not execute. Example flow selection code includes if-statements, switch-statements, goto-statements, and others, or equivalents, but flow selection code encompasses other types of constructs as well. In an example, an if-statement checks the value of the selection variable and branches to an appropriate differing section 604 based on the value of the variable. In another example, a switch statement executes an appropriate differing section 604 based on the value of the selection variable 613.

The shader merging program 500 also modifies shader program 3 502(3) such that both calls to shader program 1 and shader program 2 are calls to the merged shader program 504. In addition, the shader merging program 500 includes, in the shader program 3 502(3), code that sets the selection value to the value associated with the first shader program 502(1) before the first instance of the call to the merged shader program 504 and code that sets the selection value to the value associated with the second shader program 502(2) before the second instance of the call to the merged shader program 504 the selection variable 613. In various examples, the selection variable is passed to the merged shader program 504 as an argument, is a global variable, is stored in a register, or is transmitted from the caller to the merged shader program 504 in any other technically feasible manner.

In some implementations, the shader merging program 500 uses one or both of textual analysis or functional analysis to identify the identical sections 606 and the differing sections 604. Textual analysis includes identifying, as the identical sections 606, sections of two or more shader programs 502 that are textually identical. In some examples, the textually identical sections include different constant values as described elsewhere herein. In an example, a line of code in one shader program 502 specifies a mathematical (or other) operation where one of the operands is an inline constant. Another shader program 502 includes a line of code that performs the same operations except that the inline constant is different than the inline constant of the first shader program. Textual analysis also includes identifying, as the differing sections 604, portions of the shader programs 502 that are not textually identical. There are a large number of available tools that are able to identify identical and differing sections of text.

Functional analysis includes identifying sections of two or more shader programs 502 that are functionally identical. In an example, two sections of code (e.g., source code or object code) are "functionally identical" if the two sections accept the same inputs, perform the same operations on those inputs, and output the same outputs. As with "textually identical," "functionally identical" also encompasses the situation where two or more sections of code are identical except for specifying one or more different constant values. Functional analysis also includes identifying the differing sections 604 as one or more sections of code where at least one of the inputs, operations performed on the inputs, and outputs differs.

In some examples, functional analysis is performed by analyzing a graph representative of program flow. In the graph, nodes are variables and edges represent operations performed on the variables. Constants are part of the operations/nodes. A sub-function of the graph would be defined as a portion of the graph from one or more origin node to one or more final nodes. Functional analysis would use this graph to identify identical sections 606 having identical graph connectivity. In other words, functional analysis would identify, as an identical section 606, a sub-function that begins with the same inputs (variables), includes the same operations on those inputs and on any intermediate nodes (variables) within the sub-function, and has the same outputs. As described above, functional analysis is capable of identifying, as identical sections 606, sub-functions that are identical except for one or more constants.

In an example, the shader merging program 500 utilizes an intermediate compiler representation referred to as static single assignment ("SSA"), in which each variable is assigned only once. Compilers typically transform code such that individual variables in the code are "split" into variable versions, each of which is assigned to only once. In addition, in SSA, each operation is expressed as a tuple of (opcode, input, output), where each input is the result of a previous operation, a constant, or an input to the shader program 502 and the output is a shader program output or an input to the next operation. The shader merging program 500 would map the operations to the edges of the above-described graph and would map the SSA variables to the nodes of the above-described graph.

Several code examples are now provided to further illustrate the above techniques. Table 4 illustrates a first example, in which two shader programs 502 that are identical except for differing constants, are combined into a merged shader program 504.

TABLE 4

Example merging of shader programs specifying differing constants

```
//------
//SHADER PROGRAM 1
//------
float ReflectionFactor(float pixel_in)
{
    return pixel_in * 0.4f;
}
//------
//SHADER PROGRAM 2
//------
float ReflectionFactor(float pixel_in)
{
    return pixel_in * 1.1f;
}
//------
//MERGED SHADER PROGRAM
//------
int shader_mode;
float reflectionFactor[2] = { 0.4f, 1.1f };
float ReflectionFactor(float pixel_in)
{
    return pixel_in * reflectionFactor[shader_mode];
}
```

In Table 4, shader program 1 returns a value equal to the variable pixel_in multiplied by the constant 0.4f. Shader program 2 returns a value equal to the variable pixel_in multiplied by the constant 1.1f. It can be seen that these two shader programs are identical except that they recite different constants. Thus the shader merging program 500 creates the merged shader program 504 having the identical section of the shader programs (multiplying the value pixel_in by a constant), along with a constant selection phrase that selects a constant from the array reflectionFactor according to the value of the selection variable shader_mode.

Table 5 is an example where the shader merging program 500 identifies identical and differing sections in shader programs and forms the merged shader program 504 accordingly.

TABLE 5

Example merging of shader programs specifying differing constants

```
//------
//SHADER PROGRAM 1
//------
float3 CalculateIntensity( )
{
    float3 diffuse = Sample(diffuse_texture);
    return diffuse;
}
//------
//SHADER PROGRAM 2
//------
float3 CalculateIntensity( )
{
    float3 diffuse = Sample(diffuse_texture);
    float specular_intensity = CalculateSpecularIntensity( );
    float3 specular = Sample(specular_texture) * specular_intensity;
    return specular + diffuse;
}
//------
//MERGED SHADER PROGRAM
//------
float3 CalculateIntensity( )
{
    float3 diffuse = Sample(diffuse_texture);
    float3 colour = diffuse;
    if (shader_mode == 1)
    {
```

TABLE 5-continued

Example merging of shader programs
specifying differing constants

```
        float3 H = CalculateHalfVector( );
        float specular_intensity = H.E;
        float3 specular = Sample(specular_texture) *
specular_intensity;
            colour += specular;
        }
    return colour;
}
```

In FIG. 5, shader program 1 a first shader program calculates a lighting intensity by sampling a texture called diffuse texture. Shader program 2 samples the diffuse texture to obtain a diffuse lighting intensity but also adds a specular lighting value. The specular lighting value is calculated by calculating a specular intensity, sampling a specular texture, and multiplying the specular intensity by the sample value. The result of shader program 2 is a lighting intensity that is the sum of the specular lighting value and the diffuse lighting value.

The identical sections of shader programs 1 and 2 are the portions that sample the diffuse texture. The differing portion is the part of shader program 2 that calculates the specular lighting value and adds the specular lighting value to the diffuse lighting value. Thus the merged shader program 504 includes the identical section, assigning the diffuse value, and also includes the differing portion that calculates the sum of the specular and diffuse value. The if-statement that is dependent on the selection variable "shader_mode" executes the differing portion if the shader_mode=1 (which corresponds to shader program 2) and does not execute that portion if "shader_mode" is a value other than 1 (such as 0, which corresponds to shader program 1).

Figure 7:
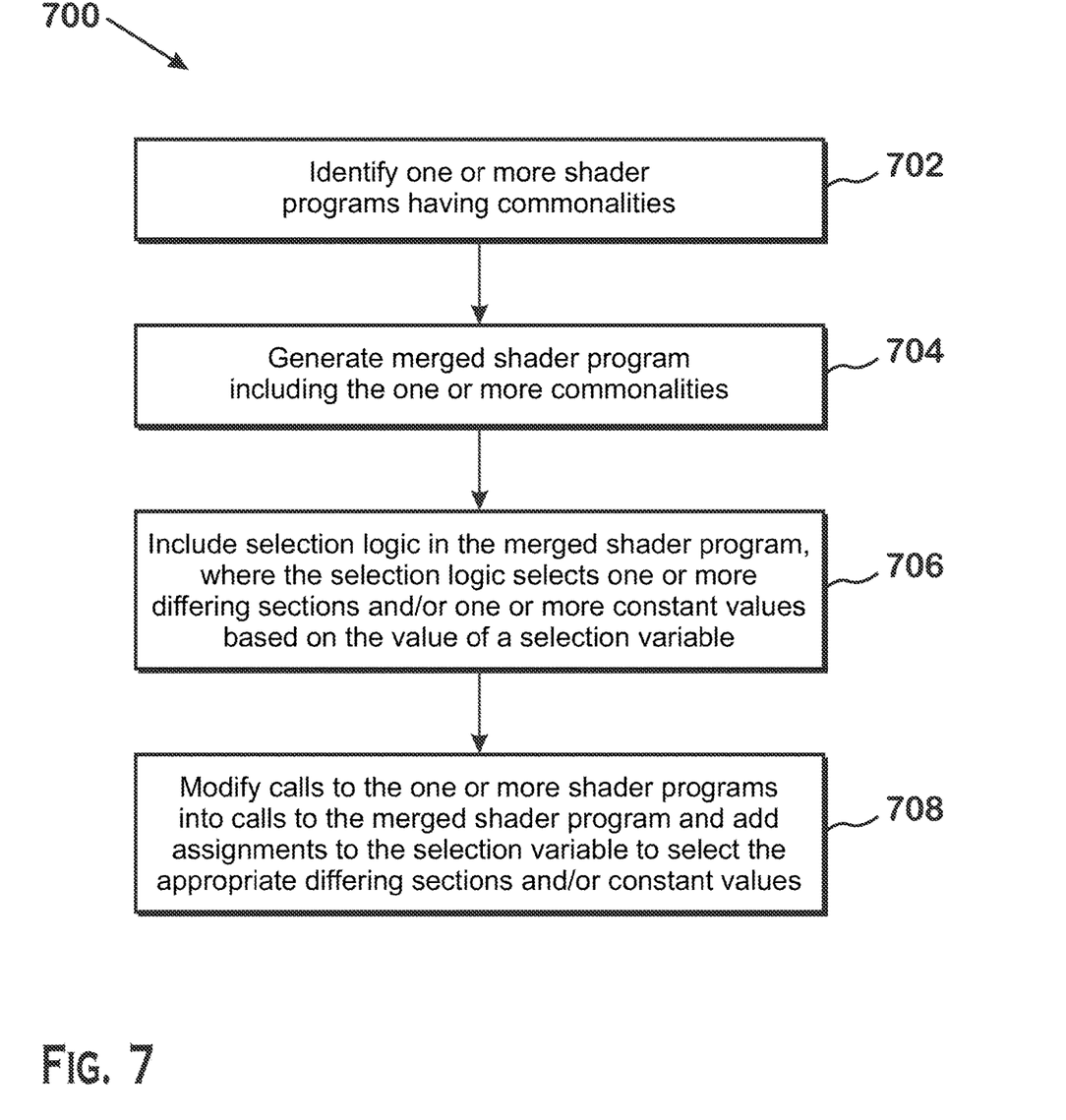
FIG. 7 is a flow diagram of a method for generating a merged shader program according to an example.

FIG. 7 is a flow diagram of a method 700 for generating a merged shader program 504 according to an example. The method 700 begins at step 702, where a shader merging program 500 identifies one or more shader programs having commonalities. The term "commonality" refers to an identical section 606 as described elsewhere herein. In some situations, an identical section differs by reciting one or more different constant values. Shader programs with commonalities sometimes have differing sections as described elsewhere herein. The shader programs in which commonalities are identified are any combination of one or more non-merged shader programs or one or more merged shader programs.

At step 704, the shader merging program 500 generates a merged shader program 504 that includes the one or more commonalities. In some instances, the merged shader program 504 also include one or more differing sections, or one or more constant selection phrases. At step 706, the shader merging program 500 includes selection logic in the merged shader program 504. The selection logic selects any combination of one or more differing selections and one or more constant values based on the value of a selection variable as described elsewhere herein. At step 708, the shader merging program 500 modifies calls to the one or more shader programs into calls to the merged shader program 504 and adds assignments to the selection variable to select the appropriate combination of differing sections and constant values.

For textual analysis applied for constant divergence, the shader merging program 500 identifies sections of two or more shader programs 502 that are identical except for one or more constant values. The shader merging program 500 generates a merged shader including the sections that are identical except for the one or more constant values. The shader merging program 500 includes code that stores each of the one or more constant values in one or more variables (such as an array). Then, the shader merging program 500 includes code that selects one of the variables, based on the selection variable passed to the merged shader program 504.

It should be understood that many variations are possible based on the disclosure herein. Although features and elements are described above in particular combinations, each feature or element can be used alone without the other features and elements or in various combinations with or without other features and elements.

The term "program" as used herein refers to computer software or firmware stored in a memory and executed by a processor. A program may be stored on a non-transitory computer-readable medium such as a read only memory (ROM), a random access memory (RAM), one or more registers, cache memory, semiconductor memory devices, magnetic media such as internal hard disks and removable disks, magneto-optical media, and optical media such as CD-ROM disks, and digital versatile disks (DVDs)

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, or the ray tracing pipeline 300 or any units illustrated therein, the shader merging program 500, and/or or the compiler/linker 506) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for reducing divergence of control flow in a parallel processor, the method comprising:
identifying two or more shader programs having common functionality;
generating a merged shader program that implements functionality of the identified two or more shader programs, wherein the functionality implemented includes the common functionality, a first execution option that, when selected, causes the merged shader program to execute functionality of a first shader program of the two or more shader programs, and not of a second shader program of the two or more shader programs, and a second execution option that, when selected, causes the merged shader program to execute functionality of the second shader program, and not of the first shader program;
modifying shader programs that call the first shader program to instead call the merged shader program and select the first execution option and not the second option; and
modifying shader programs that call the second shader program to instead call the merged shader program and select the second execution option and not the first execution option.

2. The method of claim 1, further comprising including selection logic in the merged shader program to select the first execution option or the second execution option at runtime.

3. The method of claim 2, wherein the selection logic comprises one or more operations configured to select the first execution option or the second execution option at runtime based on a selection value.

4. The method of claim 1, wherein the first execution option includes execution of a shader operation with a first constant value corresponding to the first shader program and the second execution option includes execution of the shader operation with a second constant value corresponding to the second shader program.

5. The method of claim 1, wherein the first execution option includes execution of a first set of one or more operations corresponding to the first shader program and the second execution option includes execution of a second set of one or more operations corresponding to the second shader program.

6. The method of claim 1, wherein identifying two or more shader programs having common functionality comprises identifying the common functionality using textual analysis.

7. The method of claim 6, wherein identifying the common functionality using textual analysis comprises detecting, as the common functionality, textually identical portions of the one or more shader programs.

8. The method of claim 1, wherein identifying the two or more shader programs having common functionality comprises identifying the common functionality using functional analysis.

9. The method of claim 8, wherein identifying the common functionality using functional analysis comprises identifying portions of the one or more shader programs that accept the same inputs, perform the same operations, and output the same outputs.

10. A computer system comprising:
a memory storing instructions for a compiler; and
a processor configured to execute the instructions for the compiler, to compile a set of shader programs in a manner that reduces divergence of control flow in a parallel processor that executes the set of shader programs, by:
identifying two or more shader programs having common functionality;
generating a merged shader program that implements functionality of the identified two or more shader programs, wherein the functionality implemented includes the common functionality, a first execution option that, when selected, causes the merged shader program to execute functionality of a first shader program of the two or more shader programs, and not of a second shader program of the two or more shader programs, and a second execution option that, when selected, causes the merged shader program to execute functionality of the second shader program, and not of the first shader program;
modifying shader programs that call the first shader program to instead call the merged shader program and select the first execution option and not the second option; and
modifying shader programs that call the second shader program to instead call the merged shader program and select the second execution option and not the first execution option.

11. The computer system of claim 10, wherein the processor is further configured to include selection logic in the merged shader program to select the first execution option or the second execution option at runtime.

12. The computer system of claim 11, wherein the selection logic comprises one or more operations configured to select the first execution option or the second execution option at runtime based on a selection value.

13. The computer system of claim 10, wherein the first execution option includes execution of a shader operation with a first constant value corresponding to the first shader program and the second execution option includes execution of the shader operation with a second constant value corresponding to the second shader program.

14. The computer system of claim 10, wherein the first execution option includes execution of a first set of one or more operations corresponding to the first shader program and the second execution option includes execution of a second set of one or more operations corresponding to the second shader program.

15. The computer system of claim 10, wherein identifying the two or more shader programs having common functionality comprises identifying the common functionality using textual analysis.

16. The computer system of claim 15, wherein identifying the common functionality using textual analysis comprises detecting, as the common functionality, textually identical portions of the one or more shader programs.

17. The computer system of claim 10, wherein identifying the one or more shader programs having common functionality comprises identifying the common functionality using functional analysis.

18. The computer system of claim 17, wherein identifying the common functionality using functional analysis comprises identifying portions of the one or more shader programs that accept the same inputs, perform the same operations, and output the same outputs.

19. A non-transitory computer-readable medium storing instructions that when executed, cause a processor to compile a set of shader programs in a manner that reduces divergence of control flow in a parallel processor that executes the set of shader programs, by:

identifying two or more shader programs having common functionality;

generating a merged shader program that implements functionality of the identified two or more shader programs, wherein the functionality implemented includes the common functionality, a first execution option that, when selected, causes the merged shader program to execute functionality of a first shader program of the two or more shader programs, and not of a second shader program of the two or more shader programs, and a second execution option that, when selected, causes the merged shader program to execute functionality of the second shader program, and not of the first shader program;

modifying shader programs that call the first shader program to instead call the merged shader program and select the first execution option and not the second option; and modifying shader programs that call the second shader program to instead call the merged shader program and select the second execution option and not the first execution option.

20. The non-transitory computer-readable medium of claim 19, further comprising including selection logic in the merged shader program to select the first execution option or the second execution option at runtime.

* * * * *